US009835222B2

(12) United States Patent
Berg et al.

(10) Patent No.: US 9,835,222 B2
(45) Date of Patent: Dec. 5, 2017

(54) ACTUATOR SYSTEM WITH DUAL CHAMBERS

(71) Applicant: Aalborg Universitet, Aalborg Ø (DK)

(72) Inventors: Nick Ilso Berg, Aalborg (DK); Rasmus Koldborg Holm, Aalborg (DK); Peter Omand Rasmussen, Norresundby (DK)

(73) Assignee: Aalborg Universitet, Aalborg O (DK)

( * ) Notice: Subject to any disclaimer, the term of this patent is extended or adjusted under 35 U.S.C. 154(b) by 0 days.

(21) Appl. No.: 15/034,042

(22) PCT Filed: Nov. 10, 2014

(86) PCT No.: PCT/DK2014/050376
§ 371 (c)(1),
(2) Date: May 3, 2016

(87) PCT Pub. No.: WO2015/070869
PCT Pub. Date: May 21, 2015

(65) Prior Publication Data
US 2016/0265618 A1 Sep. 15, 2016

(30) Foreign Application Priority Data
Nov. 12, 2013 (DK) .................................. 2013 70669

(51) Int. Cl.
*F16F 13/00* (2006.01)
*F04B 17/04* (2006.01)
(Continued)

(52) U.S. Cl.
CPC .............. *F16F 13/00* (2013.01); *B60G 15/04* (2013.01); *B60G 17/0157* (2013.01);
(Continued)

(58) Field of Classification Search
CPC ....... F16F 13/00; F16F 2232/06; F16H 25/24; B60G 15/04; B60G 17/0157;
(Continued)

(56) References Cited

U.S. PATENT DOCUMENTS 5,079,458 A * 1/1992 Schuster ................ H02K 41/00
310/12.24
6,190,409 B1 * 2/2001 Vitale .................. A61M 1/1046
623/3.11
(Continued)

FOREIGN PATENT DOCUMENTS

WO WO 2014/094778 A1 6/2014

OTHER PUBLICATIONS

Holm, Rasmus Koldborg, et al., Design of Magnetic Lead Screw for Wave Energy Conversion, IEEE Transactions on Industry Applications, vol. 49, No. 6, Nov./Dec. 2013, pp. 2699-2708.
(Continued)

*Primary Examiner* — Drew J Brown
(74) *Attorney, Agent, or Firm* — Woodard, Emhardt, Moriarty, McNett & Henry LLP

(57) ABSTRACT

The present invention relates to an actuator system with a magnetic lead screw, comprises a magnetic rotor and a translator cylinder, the translator cylinder comprises a magnetic stator, the translator cylinder has a closed first end and a second end confined by a lid, the lid having a shaft opening for a shaft coupled to the magnetic rotor, wherein the magnetic rotor, when inserted in the translator cylinder, is arranged to translate a linear movement of the translator cylinder into a rotational movement of the magnetic rotor by using magnetic flux interacting between the magnetic stator and the magnetic rotor, said rotational movements is being transferred through a shaft, the lid with a shaft opening arranged for receiving the shaft, wherein the shaft is
(Continued)

arranged to make both the linear and the rotational movement in the shaft opening, the lid being arranged for confining the second end of the translator cylinder, the translator cylinder confined by the lid forms, when divided by the magnetic rotor, a first chamber with a first volume and a second chamber with a second volume, wherein the first volume and the second volume changes as a function of the linear movement. The invention also relates to a method of operating an actuator system with a magnetic lead screw.

18 Claims, 11 Drawing Sheets

(51) Int. Cl.
  *F04B 19/02* (2006.01)
  *H02K 49/10* (2006.01)
  *B60G 15/04* (2006.01)
  *B60G 17/015* (2006.01)
  *F16H 25/24* (2006.01)

(52) U.S. Cl.
  CPC ............ *F04B 17/04* (2013.01); *F04B 19/022* (2013.01); *F16H 25/24* (2013.01); *H02K 49/104* (2013.01); *B60G 2202/32* (2013.01); *B60G 2202/42* (2013.01); *F16F 2232/06* (2013.01); *H02K 2201/18* (2013.01)

(58) Field of Classification Search
  CPC ............ B60G 2202/42; B60G 2202/32; H02K 49/104; H02K 2201/18; F04B 19/022; F04B 17/04
  See application file for complete search history.

(56) References Cited

U.S. PATENT DOCUMENTS

| | | | |
|---|---|---|---|
| 8,469,370 | B2 | 6/2013 | Kondo et al. |
| 2009/0251258 | A1 | 10/2009 | Rhinefrank et al. |
| 2012/0186920 | A1* | 7/2012 | Ogawa ................ B60G 17/015 188/266.1 |
| 2012/0187640 | A1 | 7/2012 | Kondo et al. |
| 2013/0060422 | A1* | 3/2013 | Ogawa ................ B60G 13/02 701/37 |
| 2015/0231942 | A1* | 8/2015 | Trangbaek ............. F16F 15/03 267/195 |
| 2016/0344312 | A1* | 11/2016 | Trangbaek ............. H02P 6/006 |

OTHER PUBLICATIONS

Holm, Rasmus Koldborg, et al., Design of a Magnetic Lead Screw for Wave Energy Conversion, 2012 IEEE, pp. 618 to 626.
International Search Report and Written Opinion dated Jun. 26, 2015 in related PCT/DK2014/050376.
Lassen, D., et al., Application of a Magnetic Lead Screw and Permanent Magnet Synchronous Machine as an Active Suspension System for an Electric Vehicle, The 1st Student Symposium on Mechanical and Manufacturing Engineering, Aalborg University, pp. 1-10, Denmark.
Snapshot of Youtube page. Video can be accessed at http://www.youtube.com/watch?v=bPgVud3-FBE.

* cited by examiner

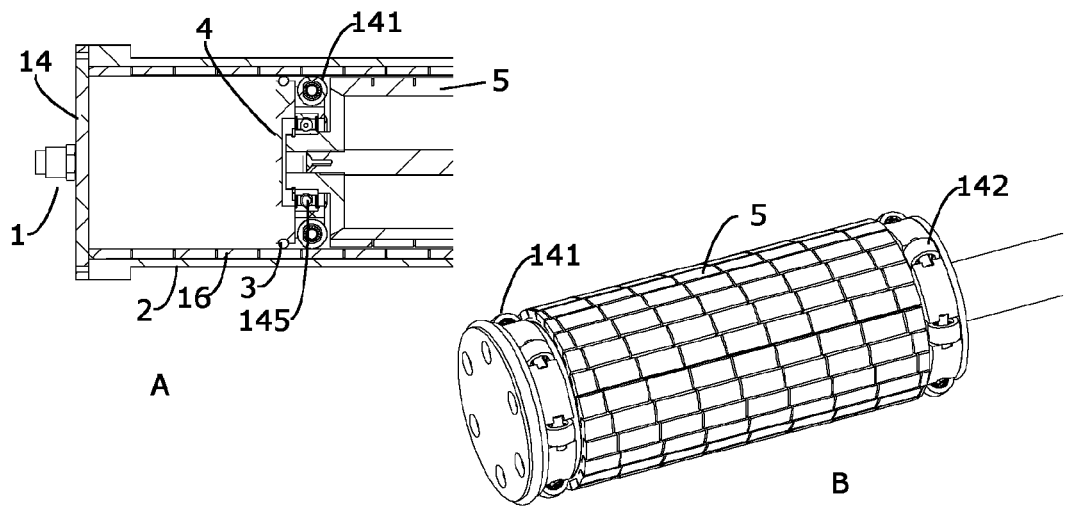
Figure 14 (A, B)
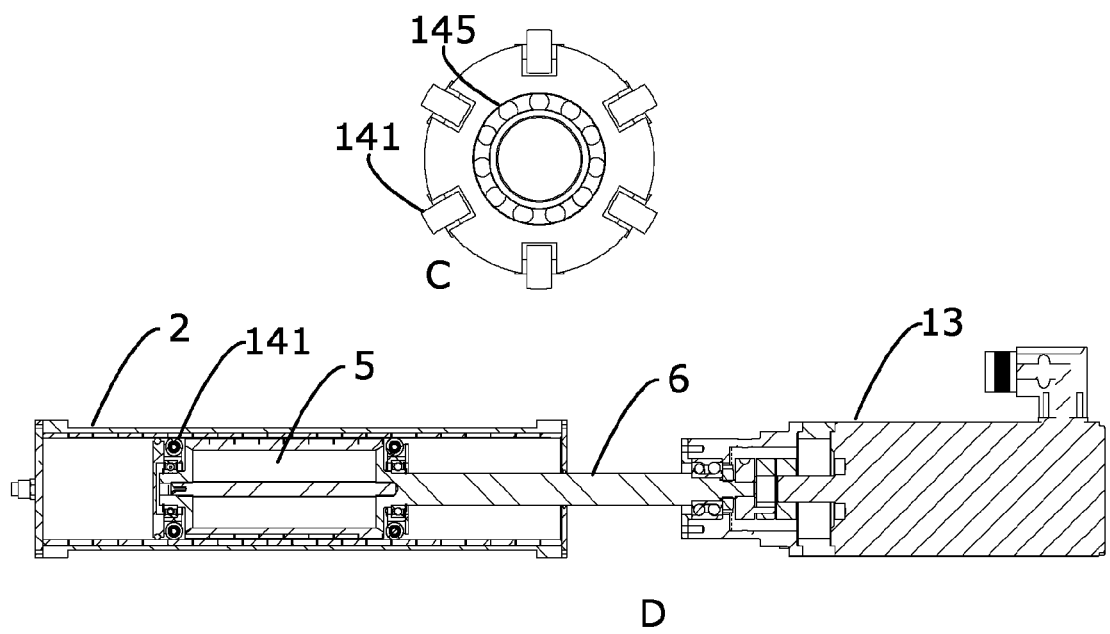
Figure 14 (C, D)

ACTUATOR SYSTEM WITH DUAL CHAMBERS

FIELD OF THE INVENTION

The present invention relates to an actuator system with a lead screw with build in chambers

BACKGROUND

The background for this invention is based on a suspension system with a lead screw, which is capable of converting linear motion into rotational motion and vice versa.

U.S. Pat. No. 8,469,370 discloses a suspension device and includes: a member coupled to one of a vehicle body and a vehicle axle; an outer cylinder coupled to the other one of the vehicle body and the vehicle axle and disposed at the outer circumference of the member; and a bearing that is interposed between the member and the outer cylinder, the bearing having balls that rollably contact at least one of the member and the outer cylinder, and a ball case that retains the balls rollably.

A disadvantage of the known technology is that the pressure chambers are located adjacent to the lead screw and thus the system is not compact.

OBJECT

The object of the invention is to provide a compact lead screw system, which is capable of withstanding high amplitude and high frequency forces with low wear.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Thus, the above described object and several other objects are intended to be obtained in a first aspect of the invention by providing an actuator system comprising:

- a magnetic lead screw, comprises a magnetic rotor and a translator cylinder, the translator cylinder comprises a magnetic stator,
- the translator cylinder has a closed first end and a second end confined by a lid, the lid having a shaft opening for a shaft coupled to the magnetic rotor,
- wherein the magnetic rotor, when inserted in the translator cylinder, is arranged to translate a linear movement of the translator cylinder into a rotational movement by using magnetic flux interacting between the magnetic stator and the magnetic rotor, said rotational movements is being transferred through a shaft,
- the lid with a shaft opening arranged for receiving the shaft, wherein the shaft is arranged to make both the linear and the rotational movement in the shaft opening, the lid being arranged for confining the second end of the translator cylinder,
- the translator cylinder confined by the lid forms, when divided by the magnetic rotor, a first chamber with a first volume and a second chamber with a second volume, wherein the first volume and the second volume changes as a function of the linear movement.

The invention is particularly, but not exclusively, advantageous as the magnetic lead screw (MLS) compared to a traditional mechanical lead screw (power screw, ball screw), as there is no physical contact between the force transferring parts, and hence the frictional losses are reduced and wear eliminated.

As with ball screws, the MLS is by nature not self-locking, but in contradistinction it has a form of built-in overload protection that prevents it from being permanently damaged in case of exceeding its force/torque capability.

Also, because no physical connection is present between the rotor/translator, the translator can be fully decoupled from the rotor and the electrical machine driving it, making it possible to operate in harsh environments.

As the MLS uses magnets to form the thread of the lead screw, the MLS will act as a sinusoidal spring; this means that when used in very precise applications both the translator and rotor position should be controlled in order to make an accurate position control.

In addition the MLS system with its double chambers has a very compact design and an improved capability of withstanding high frequency forces, as the magnet design works as a sinusoidal spring.

The prior art with a classic lead screw will fail if forces of high amplitude and high frequency is applied.

According to one embodiment of the invention, the magnetic rotor is arranged with a magnetic domain forming a helically shape and the magnetic stator is arranged with a magnetic domain forming a helically shape.

An advantage of this embodiment is that, if the applied force exceeds the force capability (stall force) of the MLS, it will not be damaged but instead cause pole slipping, where the "magnetic threads" on the translator slip past the opposing "magnetic threads" on the rotor. However, as pole slipping is generally not desired, the stall force should be large enough to withstand the forces generated under normal operation. Besides the stall force, one of the most important parameters regarding the MLS is the pitch, which defines how much the translator must be moved in order to turn the rotor one complete revolution.

The high efficiency is also one of many advantages by using a MLS instead of using a mechanical lead screw.

According to one embodiment of the invention, the first and second chambers are sealed from each other by at least one first seal arranged to operate between the translator cylinder and the magnetic rotor.

An advantage of this embodiment is that an air/liquid tight compartment is defined by the translator cylinder and rotor, assisted by the first seal.

According to one embodiment of the invention, the top chamber (TC) is arranged to be sealed by at least one second seal.

In an embodiment of the invention, the second seal being an axial bearing and thus sealing the top chamber TC from the surroundings of the actuator system.

An advantage of this embodiment is that the seal only exhibits linear movement, and not both rotational and linear movement.

In an embodiment of the invention, the second seal is a bellow surrounding the shaft or any other component making the top chamber tight.

An advantage of this embodiment is that no seal is needed between the shaft and the shaft opening of the lid.

In an embodiment the lid is not even present as the bellow defines the top chamber.

According to one embodiment of the invention, wherein the magnetic rotor is arranged in the translator cylinder with at least one guide system.

An advantage of this embodiment is that the guide system ensures the air gap between the rotor and the translator cylinder, thus avoiding direct magnetic contact between the two magnetic elements.

According to one embodiment of the invention, wherein the first chamber comprises a first fluid and the second chamber comprises a second fluid.

An advantage of this embodiment is that this invention compared with known technology, is the fact that the MLS is combined with two gas or liquid chambers, which can be used either as a spring or pump configuration, or any other technology using gas or liquid.

According to one embodiment of the invention, wherein the first fluid is being in a gaseous state and the second fluid is being in a liquid state.

An advantage of this embodiment is that the system can work with fluids in different phases.

According to one embodiment of the invention, wherein the device further comprises at least one reservoir tank, said reservoir tank being arranged for communication with the first fluid and/or second fluid.

An advantage of this embodiment is that whenever pressure is generated it can be stored for later purposes, thereby minimizing the need for external pressure generating systems.

According to one embodiment of the invention, wherein the invention further comprises an electrical machine, and wherein the shaft is connected with the electrical machine.

An advantage of this embodiment is that the electrical machine can either absorb the rotational movement into electrical power or electrical power can be applied to the machine to generate linear movement.

According to one embodiment of the invention, wherein the shaft transfers the rotational movement of the rotor to the electrical machine through a shaft coupling coupled to the shaft.

An advantage of this embodiment is that the shaft coupling absorbs misalignment between the shaft and the electrical machine.

According to one embodiment of the invention, wherein the first and/or second chamber comprises at least one valve arranged for controlling a pressure in the chamber.

An advantage of this embodiment is that the valve can be set to specific pressure or can be fully closed depending on the specific embodiment.

According to one embodiment of the invention, wherein at least one of the first chamber and second chamber operates as a pump.

An advantage of this embodiment is that the linear movement can be translated into a pumping force.

According to one embodiment of the invention, wherein at least one of the first and second chambers works as a spring or a damper.

An advantage of this embodiment is that because of the design of the MLS it is possible to use the chambers as a damper or spring, which is not possible with standard mechanical lead, ball or roller screw (i.e. mechanical lead screw).

According to one embodiment of the invention, wherein the magnetic lead screw is configured as an active damper for a vehicle.

An advantage of this embodiment is that energy dispatched in the damper can be used for charging the batteries or any other energy accumulation device, which is not possible with a normal passive hydraulic damper. Further can the handling and comfort of the vehicle be actively controlled during operation of the vehicle.

According to one embodiment of the invention, wherein the active damper further comprises a coil spring.

An advantage of this embodiment is that the MLS only dampens the vehicle body and the weight of the body is absorbed at the mechanical coil spring with constant spring stiffness.

According to one embodiment of the invention, wherein two or more magnetic lead screws systems are coupled in parallel or in series.

An advantage of this embodiment is that inertia per stall force is minimized, and the chamber volume is doubled or more. By connecting the chambers of the connected MLS, it is possible to increase the effect of the utilization of the chambers.

In a second aspect, the present invention relates to a method for operating an actuator system, the actuator system comprises a magnetic lead screw, with a magnetic rotor being operably positioned in a translator cylinder with a magnetic stator, the translator cylinder having a closed first end and a second end confined by a lid, the lid having a shaft opening for a shaft coupled to the magnetic rotor, the method comprising:

providing a linear movement of the translator cylinder, translating the linear movement of the translator cylinder into a rotational movement of the magnetic rotor by using a magnetic flux interacting between the magnetic stator and the magnetic rotor, said rotational movement being transferred through a shaft, receiving the shaft in the shaft opening, where the shaft carries out both the linear and the rotational movement in the shaft opening, dividing the translator cylinder by the magnetic rotor, and thereby forming a first chamber with a first volume and a second chamber with a second volume, changing the first volume and the second volume as a function of the linear movement.

The first aspect and second aspect of the present invention may each be combined with any of the other aspects. These and other aspects of the invention will be apparent from and elucidated with reference to the embodiments described hereinafter.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE DRAWINGS

FIG. 14 shows an embodiment of a linear guide system for the present invention.

DETAILED DESCRIPTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

By using a Magnetic Lead Screw (MLS), it is possible to convert a "slow" linear motion of a translator into a faster rotational motion of the rotor.

Figure 1:
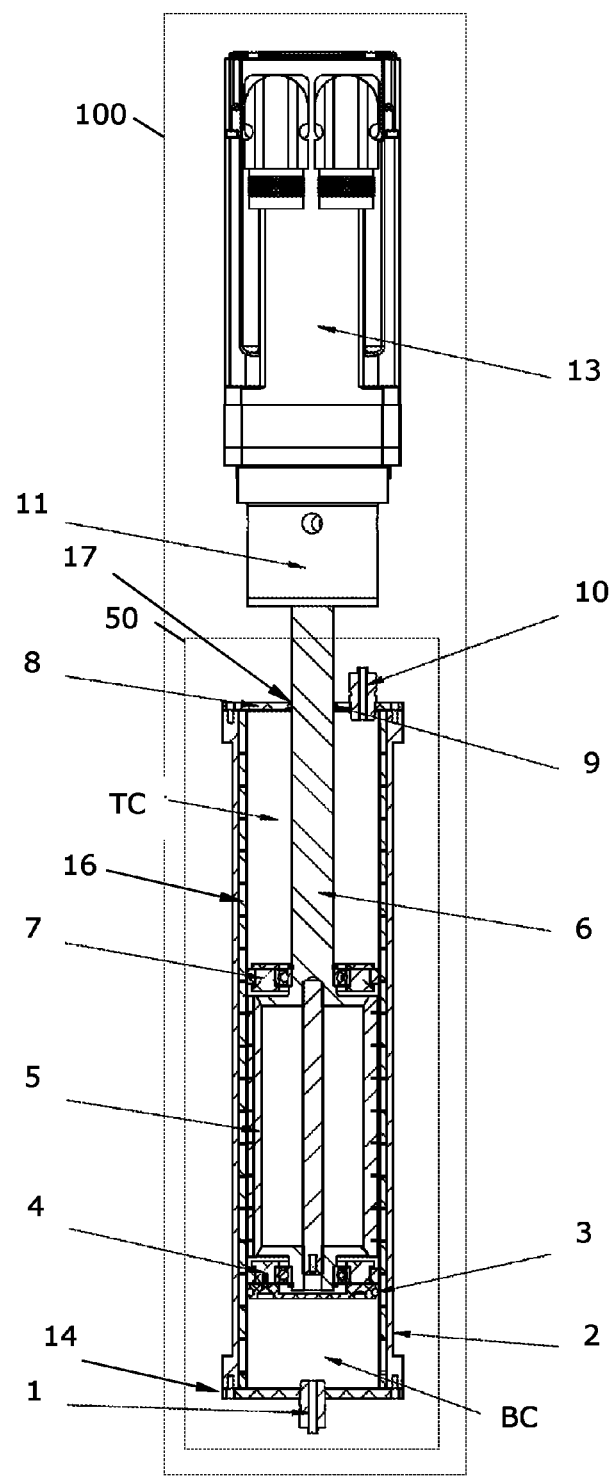
FIG. 1 shows an embodiment according to the present invention.

FIG. 1 shows an embodiment of the present invention with a magnetic lead screw 50 with fluid chambers TC, BC and connected to an electrical machine 13. The system will now be explained in more details.

Due to the inventors special designed Magnetic Lead Screw (MLS) with a rotor mounted inside a translator, it is possibly to utilize two chambers, Top Chamber TC, and Bottom Chamber BC on each side of the rotor 5 of the MLS 50. Because of a special constructed guide system of the MLS, the chambers are fully gas- or liquid proof.

FIG. 1 shows a sectional view of an example of a MLS system, with the different items highlighted and the two different chambers are depicted.

Figure 2:
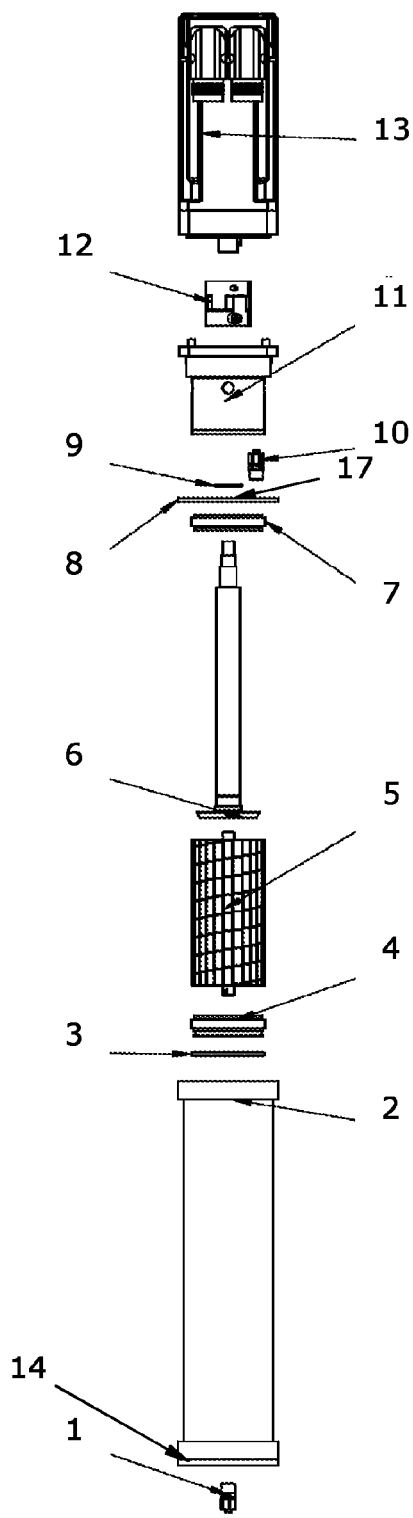
FIG. 2 shows the exploded view of an embodiment according to the present invention.

FIG. 2 shows an exploded view of an example of a MLS system depicted in FIG. 1. The items of the MLS are explained as followed:

The translator cylinder 2 of the MLS is designed to receive the rotor 5 of the MLS, the rotor 5 operates in the translator cylinder 2 with help of a bottom guide system 4 and top guide system 7, in addition there is a bottom guide gasket 3, in an embodiment a top guide gasket may also be provided, such a gasket may work as a redundant gasket, or instead of the bottom guide gasket 3. The top guide gasket is not shown on the figures.

The rotor 5 is attached to a shaft 6, thereby communicating with each other.

In an embodiment the shaft is connected to a machine, such as an electrical machine 13, the electrical machine can operate as a generator or as a motor depending on the specific implementation of the magnet lead screw system 100.

In an embodiment the shaft 6 is connected to the machine 13 through a shaft coupling 12, the function of the coupling is to absorb misalignments between the machine 13 and the shaft 6.

In an embodiment the magnet lead screw system 100, is equipped with an extra set of bearings, namely an axial bearing housing with an axial bearing 11.

The advantage of this embodiment is that the MLS 50 when in operation generates a torque due to the rotation, and also axial force due to the linear movement. Traditional electrical machines 13 are not designed to absorb large axial force through its bearing system, thus an additional axial bearing 11 is needed. In some embodiments the machine 13 is designed to operate with axial forces and thus the additional axial bearing 11 is not needed.

In an embodiment the shaft coupling 12 and the axial bearing 11 are integrated in one unit.

The translator cylinder 2 is confined by a top plate 8 which forms a lid 8 for the cylinder top end. The lid 8 has a shaft opening 17 for allowing linear and rotational movement of the shaft through the shaft opening 17

The shaft opening 17 is sealed with a top plate gasket 9 or a lid gasket. The function of the lid gasket 9 is to ensure that the translator cylinder 2 is air and liquid tight.

As can be seen the bottom chamber, BC of the MLS 50, is restricted by the bottom plate 14 and the end linear/rotary guide system 4 of the rotor 5 of the MLS.

In an embodiment the bottom plate 14 is an integrated translator cylinder 2.

Figures 3, 4:
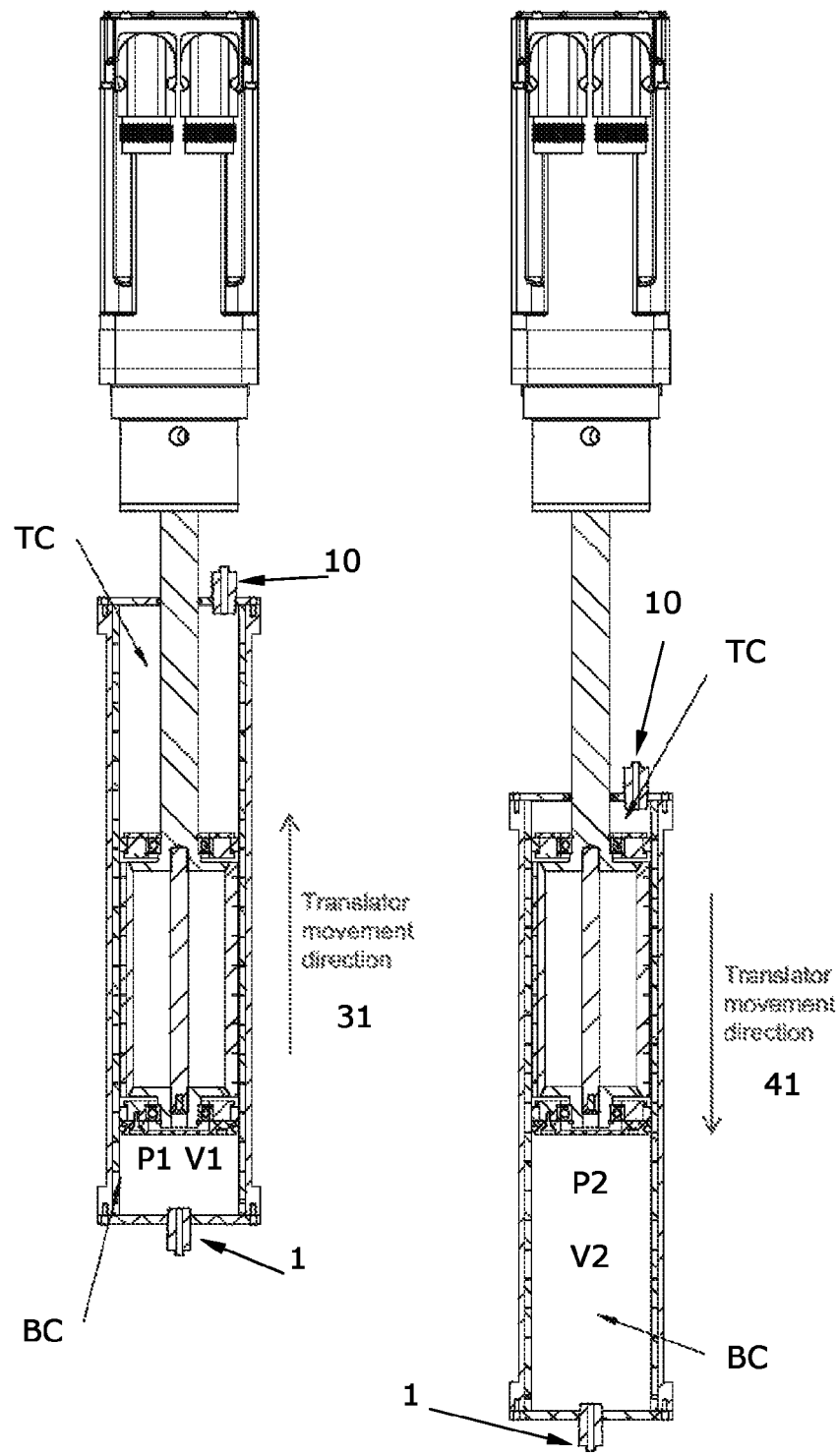
FIG. 3 shows the embodiment with the magnetic lead screw fully compressed.
FIG. 4 shows the embodiment with the magnetic lead screw fully extended.

The configuration of the embodiment makes it possible to mount a gasket 3 in the end of the guide system 4 which thereby reduces the leakage from the chamber, such that higher pressure levels are achieved. As the translator 2 moves back and forth, the bottom chamber and top chamber volume changes as depicted in FIG. 3 and FIG. 4. These changes in volume could be utilized as a pump, by implementing a standard check valve 1, 10 at the inlet and outlet. In an embodiment it is possible by controlling/restricting the gas/liquid flow through the valve 1, 10 the chambers, that the system could be used as a gas/liquid spring, which combined with the MLS ability to regenerate any linear movement into energy could be used as a high efficiency active damper system for a vehicle.

In an embodiment it is possible by using the top chamber TC as a pump and the bottom chamber BC as a spring, the use of an auxiliary pump system could be reduced, by using the top chamber TC pumping effect to control the pressure level in the bottom chamber BC.

Figure 5:
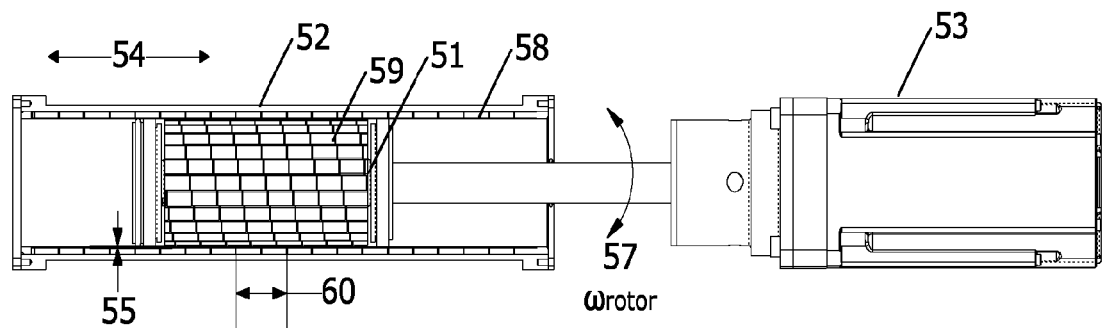
FIG. 5 shows an illustration of the magnetic lead screw concept.
Figure 6:
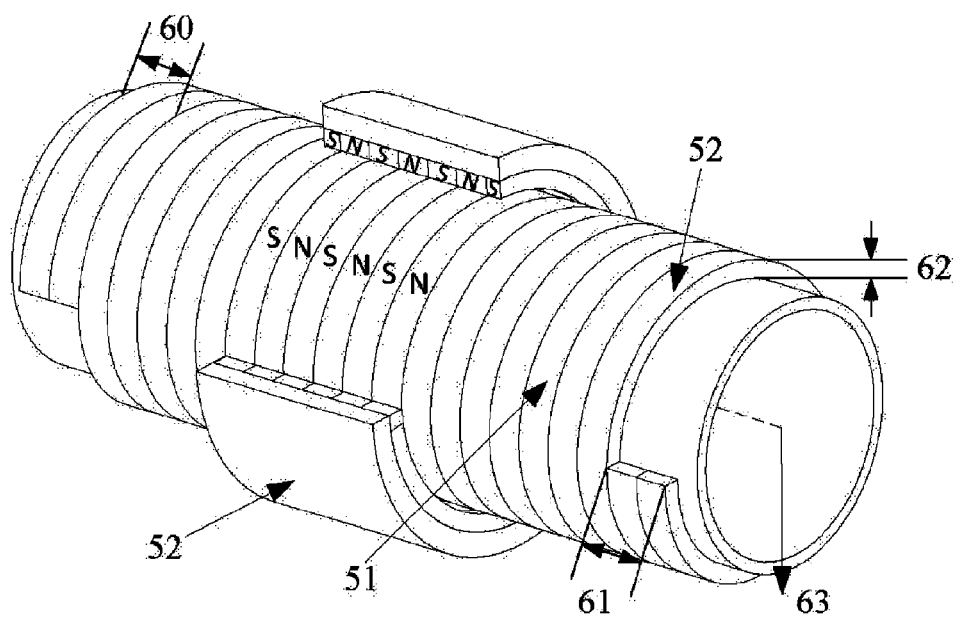
FIG. 6 shows a further illustration of the magnetic lead screw concept.

FIG. 5 illustrates the concept of such a MLS, which consists of a translator part 52 and a rotor part 51 connected to a generator/motor 53 through a shaft 57. On the inner side of the translator there is a thread formed by permanent magnets 58, with a helically shaped and radially magnetized magnets, this is also the case for the rotor, which has a corresponding external magnetic thread 59. Due to the magnetic flux running through the permanent magnets on the rotor and translator through an air gap 55, it is thus possible to convert the linear motion 54 of the translator into a rotational motion of the rotor, $\omega_{rotor}$ 57 which can be used to drive a generator or motor.

In an embodiment the magnetic domain of the rotor and the stator is defined by mounting small magnets so a helically shape is formed a long the rotor and the stator.

An advantage of using a MLS compared to a traditional mechanical lead screw (power screw, ball screw) is that there is no physical contact between the force transferring parts, and hence the frictional losses is reduced and wear eliminated. Another advantage is that, if the applied force exceeds the force capability (stall force) of the MLS, it will not be damaged but instead cause pole slipping, where the magnetic threads on the translator slip past the opposing magnetic threads on the rotor. However, as pole slipping is generally not desired, the stall force should be large enough to withstand the forces from normal operation. Besides the stall force, one of the most important parameters regarding the MLS is the pitch, which defines how much the translator must be moved in order to turn the rotor one complete revolution. A brief discussion of these parameters will be given in the following.

The stall force is a function of the rotor diameter and rotor length, the pitch and the air gap 55, i.e. the length between the rotor and the translator, but also of the magnet type and magnet thickness. By using the Hallbach effect for the magnet configuration and/or flux focusing it is possible to increase the stall force even further. If the air gap length 55, between the rotor 51 and the translator 58, is held constant while increasing the diameter of the rotor and translator linearly, the surface area of the magnets on the rotor and translator will increase correspondingly, hence resulting in a linear increase in the stall force.

Figure 7:
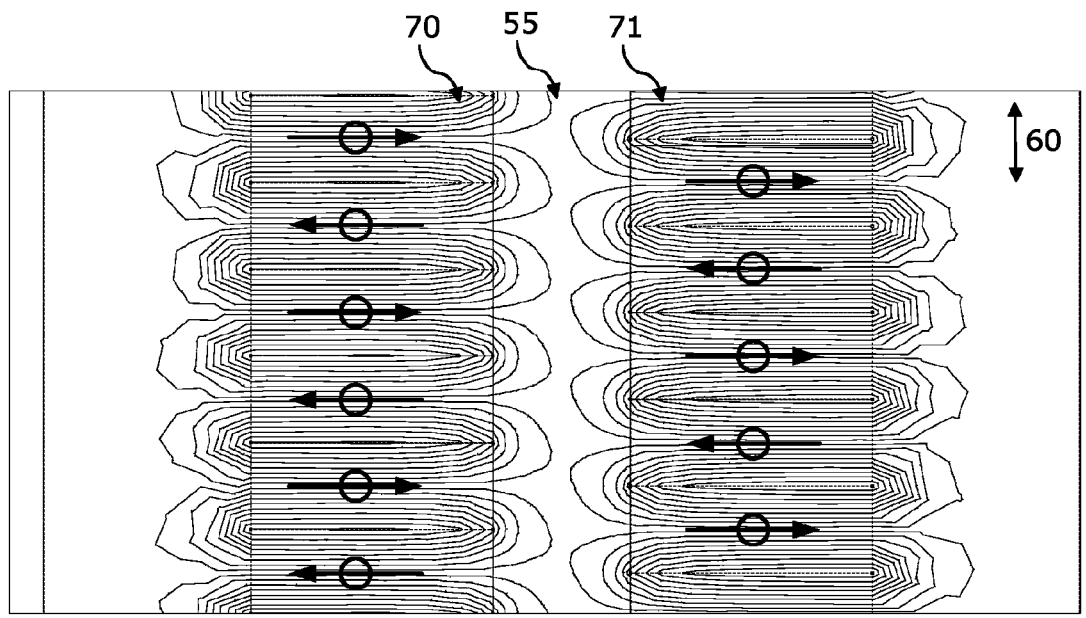
FIG. 7 shows the flux lines in the MLS in case of a small lead relative to the air gap.

One of the other parameters having a large influence on the stall force is the lead 60, which is defined as the length of one magnetic pole pair 61. When the MLS is equipped with one magnetic thread the length of the lead and pitch are equal, if the MLS has two threads the length of the lead is half the length of the pitch etc. When the lead 60 is decreased while the total length of the rotor is held constant, the number of poles increases, which is also the case for the stall force until a certain optimal point, after which the lead becomes too small. By further decreasing the lead 60 beyond this optimum, the difference between the air gap length 55 and the length of the magnets 61 themselves becomes too small, and hence the magnetic flux will primarily flow between the magnets on the rotor and the translator respectively, instead of from the rotor to the translator through the air gap 55, see FIGS. 7 and 8. The thickness of the magnets 62 is also a variable of the magnetic field Where FIG. 7 shows a 2D flux diagram with a given air gap 55 and a small pole width 61, causing the flux 70 on the left side to flow at the left side and the flux 71 on the right side also to flow at the right, whereby no flux lines flow across the air gap 55.

Figure 8:
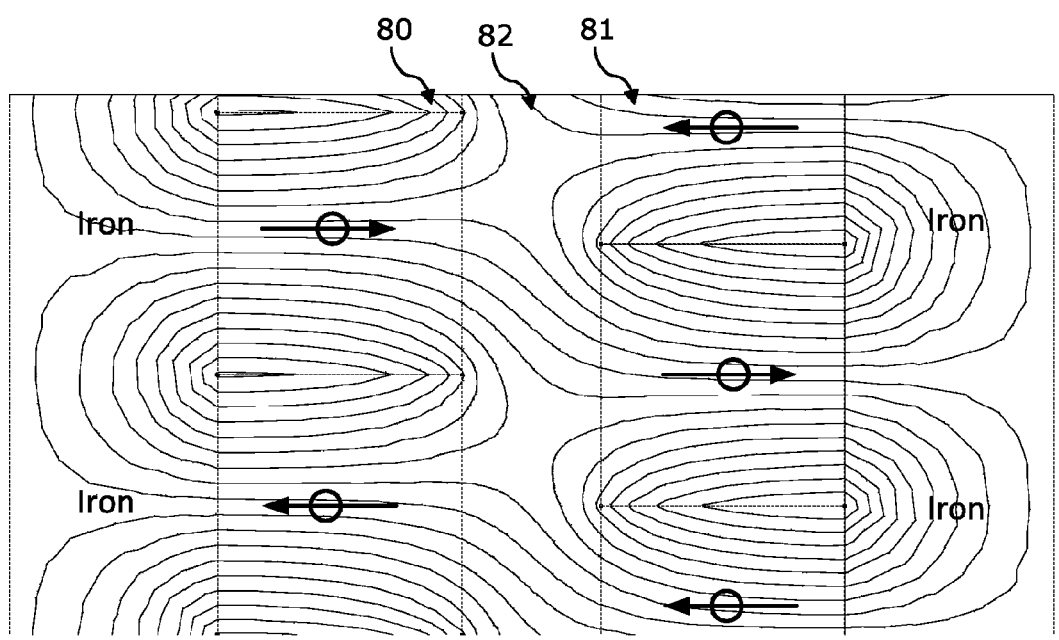
FIG. 8 shows the flux lines in the MLS in case of a large lead relative to the air gap.

FIG. 8 shows 2D flux diagram with a better air gap 55 and pole width 61 ratio. Here it can be seen that the magnet flux flows 82 flows in the air gap 55.

The pitch is also important in regards to the angular velocity of the MLS-rotor, since the pitch defines the gearing ratio between the slow linear motion 54 of the translator and the faster rotation of the rotor, $\omega_{rotor}$. If the translational velocity, and hence the translator, is held constant, the MLS-rotor will rotate faster when having a small pitch compared to a large pitch. The relation between the linear velocity $v_{lin}$ 54 of the translator and the angular velocity $\omega_{rotor}$ of the MLS-rotor is thus given by the gearing ratio denoted $N_g$:

$$\omega_{rotor} = N_g \cdot v_{lin} \quad (1)$$

$$N_g = \frac{2 \cdot \pi}{l_{pitch}} \quad (2)$$

The chambers TC and BC inside the MLS 50 work as a normal pneumatic or hydraulic cylinder because of the bottom gasket around the linear guide. As seen in FIG. 4 the MLS bottom chamber volume V2 is in this state at maximum and the pressure inside the MLS, P2 could be set to atmospheric pressure or any other pressure delivered through a valve. In the next state, FIG. 3, the MLS is contracted to minimum length and the bottom chamber volume is now at its minimum V1.

In order to see the effect of the volume decrease from state to state, a quick example with dimensions will be given:

In order to develop pressure inside the bottom chamber BC the MLS 50 needs to contract from maximum to minimum position as shown in FIG. 4 and FIG. 3. In order to find the pressure developed because of the contraction, the following equation is set up:

$$P_1 \cdot V_1 = P_2 \cdot V_2 \Leftrightarrow P_1 = \frac{P_2 \cdot V_2}{V_1} = \frac{P_2 \cdot A(x_{bottom} - x_{stroke})}{A \cdot x_{bottom}} = \frac{P_2 \cdot (x_{bottom} - x_{stroke})}{x_{bottom}}$$

By using $x_{bottom}$=0,003 m, $x_{stroke}$=0, 107 m and a pressure P2=1·10$^5$ N/m$^2$=1 bar the pressure developed is found to P1=34,5 bar. Which correspond to a force of 7,6 kN.

The example shows the developed pressure in the bottom chamber BC, but the procedure for the top chamber TC will be similar. Also by using the chambers in "reverse" a pressure supplied from the outside to the chambers will produce a "force" acting together with the force applied from the motor, thereby making the MLS with use of chambers capable of reaching maximum force without overloading the motor.

FIG. 9 to FIG. 12 shows various combinations of the utilization of the two chambers, with different valve combinations.

Figure 9:
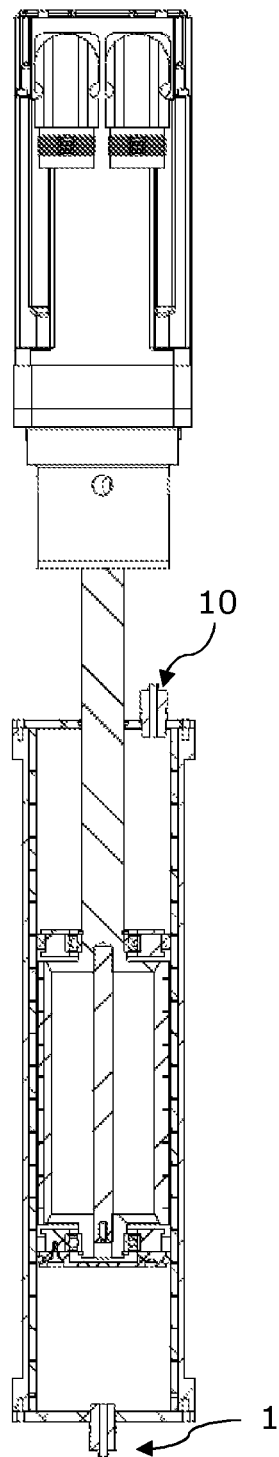
FIG. 9 shows an embodiment of the present invention.

In FIG. 9 the pressure in the two chambers are controlled by two valves, i.e. first valve 1 in the bottom chamber BC and a second valve 10 in the top chamber TC.

In an embodiment the pressure in the first and the second chamber is controlled by the valves 1, 10, where the valves are set to a predefined pressure.

In an embodiment the first and the second chamber is connected to a reservoir tank through tube or pipe.

Figure 10:
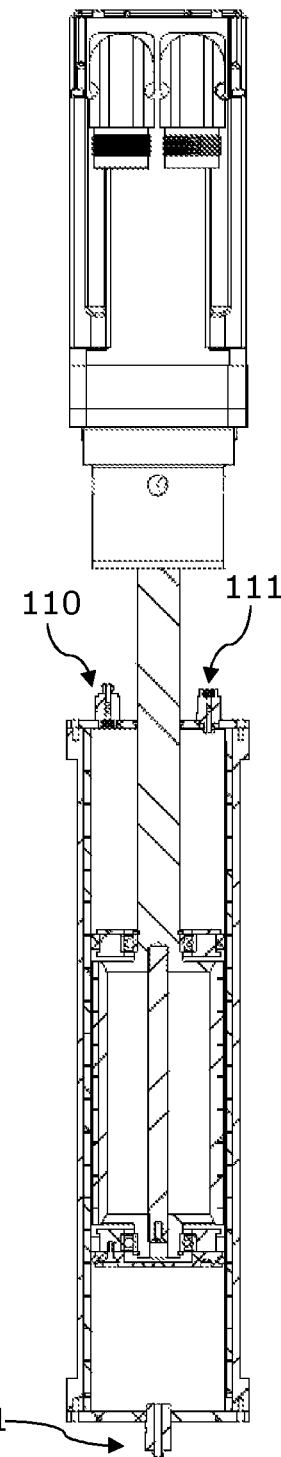
FIG. 10 shows an embodiment of the present invention with different valve configuration.
Figure 11:
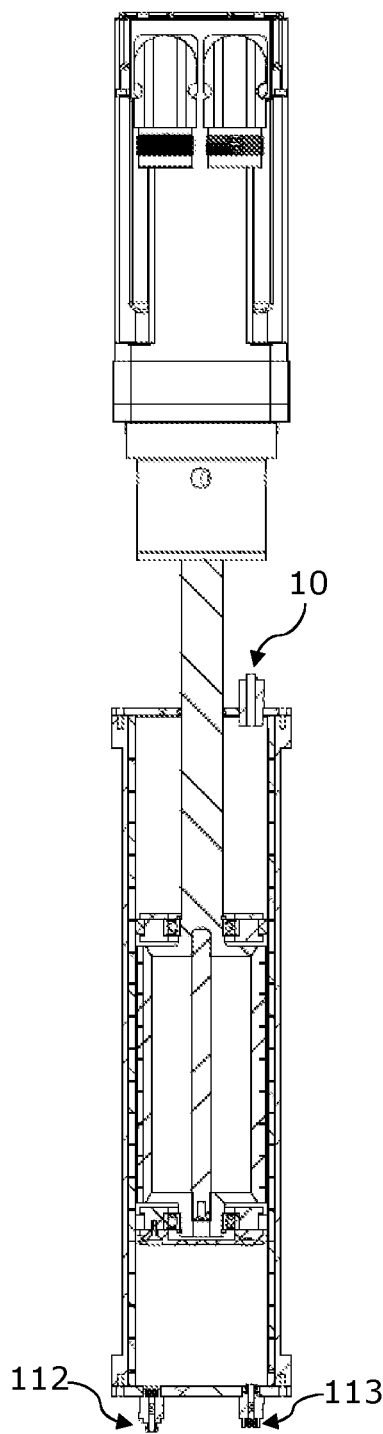
FIG. 11 shows an embodiment of the present invention with different valve configuration.

In FIG. 10 the pressure in the bottom chamber is controlled by a valve while the top chamber acts as a pump due to the two opposite facing check valves 110, 111, In FIG. 11 the bottom chamber acts as a pump due to the two opposite facing check valves 112, 113 and the pressure in the top chamber is controlled by the valve.

Figure 12:
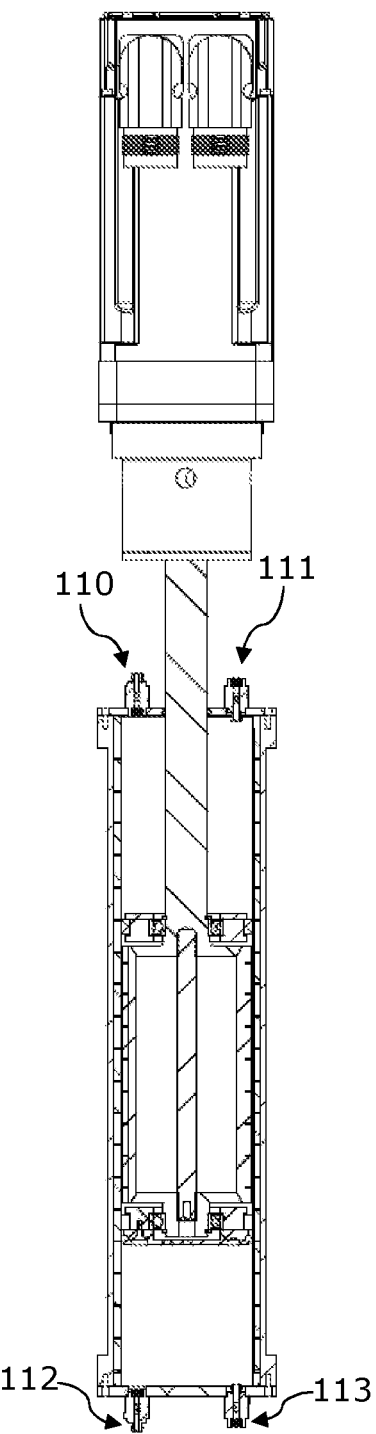
FIG. 12 shows an embodiment of the present invention with different valve configuration.

In FIG. 12 both chambers acts as pumps due to the two opposite facing check valves 110, 111 in the top chamber and to the two opposite facing check valves 112, 113 in the bottom chamber.

The pumping effect of the chambers inside the MLS could be used as a cooling system for the motor/generator 13 of the MLS, by using the gas/liquid flow from the pumping effect as cooling medium; such cooling medium can be used for cooling the motor/generator.

In an embodiment the cooling medium can be used for cooling other equipment, e.g. used in a vehicle the cooling medium can be used for cooling other equipment in the vehicle.

In an embodiment the MLS system is configured with two gas chambers to be used as an active suspension system for a vehicle. Thereby combining both a gas suspension system and an active damping system, which makes it possible to recover energy dispatched in the MLS.

Depending on the performance requirements of the technology using a MLS, in various embodiments the chambers could either be filled with liquid fluid or gaseous fluid and could work either as a pump, spring or damper.

In an embodiment the MLS 50 is configured as an active damper for a vehicle. The MLS and chamber utilization mechanism will be able to elevate the vehicle body. By using the dimensions from the example above and a normal spring stiffness of 30 N/mm for a coil spring mounted in a vehicle, the maximum elevation of the vehicle body or any other mass is calculated, when the MLS is connected in parallel with a coil spring:

$$x_{elevationMAX} = \frac{F_{stall}}{k_{spring}} = \frac{3000 \text{ N}}{30 \text{ N/mm}} = 100 \text{ mm}$$

Figure 13:
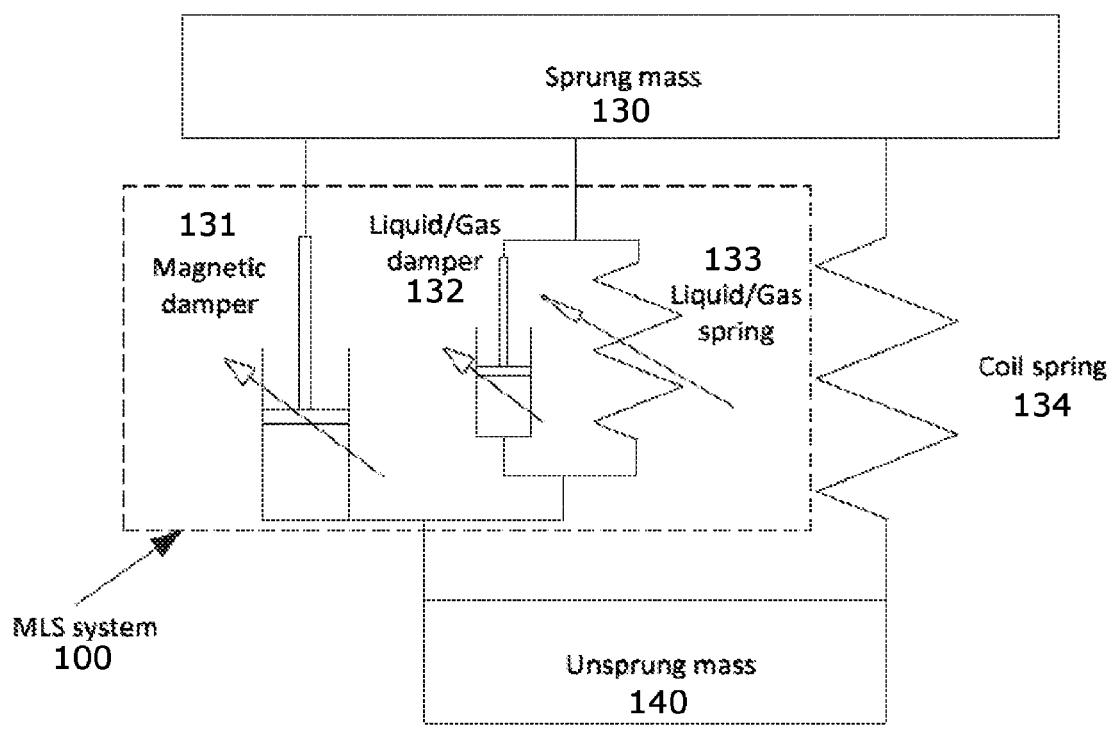
FIG. 13 shows the schematic for MLS damper configuration in parallel with a mechanical coil spring.

However by using the chambers inside the MLS, it is possible to elevate the body above the calculated maximum elevation. This is done using an external pressure (not shown) supplied to the MLS chamber TC, BC through one of the valves 1, 10, thereby creating an air spring inside the MLS, this configuration is seen in FIG. 13. The MLS is in this embodiment still capable of delivering a damping force of 3 kN even though the vehicle body or any other mass is elevated.

FIG. 13 shows sprung mass 130 and 140 at each end of the MLS system 100. The MLS system in this embodiment consists of a magnetic damper 131, liquid/gas damper 132, liquid/gas spring 133, and in parallel with the MLS system 100 is the coil spring 134.

In an embodiment a new linear guide configuration is implemented in the MLS chamber configuration. FIG. 14 shows the design, which is using the princip of omni wheels, i.e. converting the linear guide problem from a sliding contact to a rotating contact, which potentially lowers the power loss.

FIG. 14 is split into four smaller parts, A, B, C, and D. FIG. 14A shows the bottom part of a MLS system 100, with part of the translator cylinder 2, the bottom plate 14, a bottom valve 1, part of the rotor 5. The rotor 5 has a guiding system 4 attached with wheels 140 and a gasket 3 to ensure the pressure in the the bottom chamber. FIG. 14B shows the rotor 5 with guiding wheels at both ends, 141, 142.

FIG. 14C shows an end view of the rotor, with the guiding wheels 140, also known as omni wheels. The omni wheels ensures the linear movement in the translator cylinder 2, whereas the ball bearing 145, ensures low friction rotational movement of the rotor 5. FIG. 14D shows the system with the MLS, the shaft 6 and the electrical machine 13.

FIG. 14D shows an embodiment where the MLS technology utilizing the chambers with wheels as linear guide system 141, 142 as guiding system. The MLS system is generic capable of using different guiding systems, and is thus not limited to use wheels or linear bearings as linear guide system.

Figure 15:
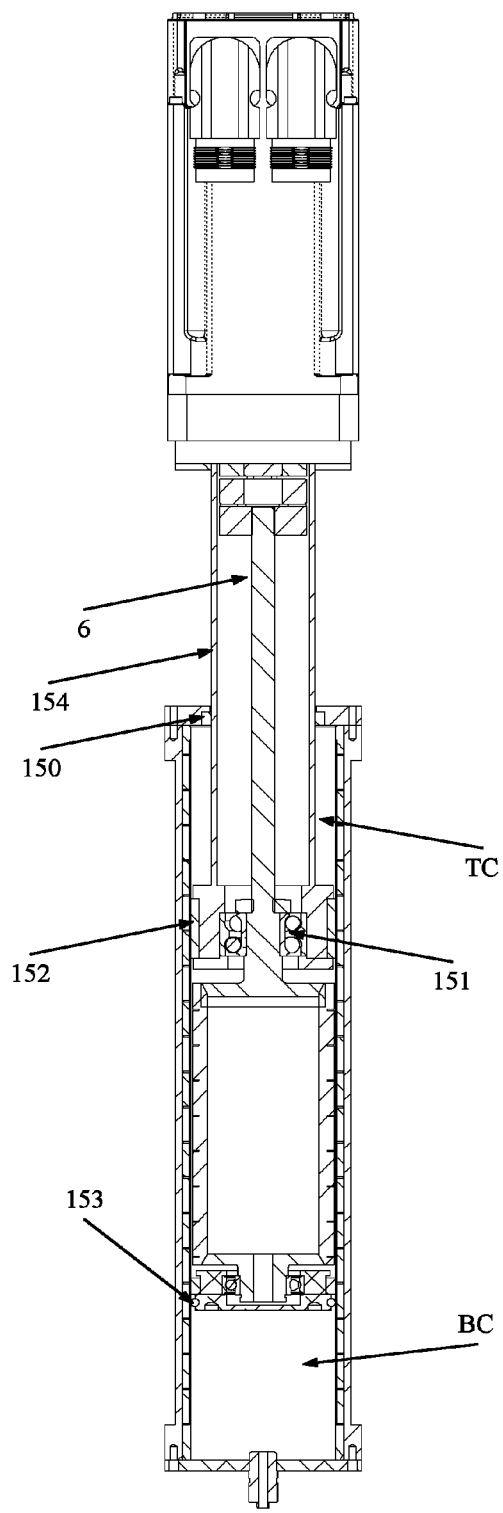
FIG. 15 shows an embodiment of the axial and linear guide system for the present invention.

FIG. 15 shows an embodiment of the present invention with a gasket 150 in the top plate sealing the top chamber TC. The shaft 6 operates in the shaft opening 17 cover by a shaft cover 154. The gasket 150 only exhibits linear movement, and not both rotational and linear movement, as the axial bearing 151, carries the axial forces and linear bearing 152 carries the linear forces. A bottom gasket 153 seals the bottom and top chamber of from each other.

Figure 16:
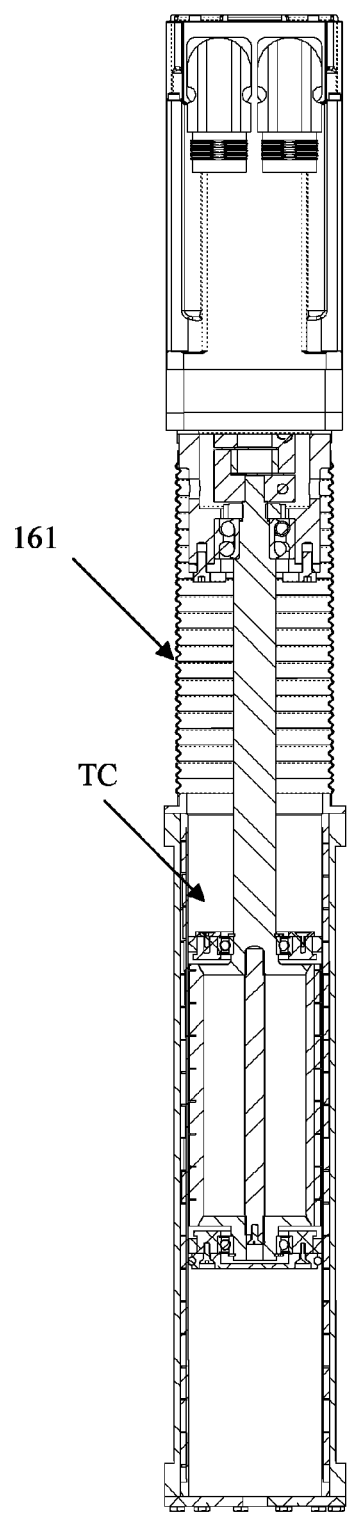
FIG. 16 shows an embodiment of the sealing configuration with a bellow for the present invention.

FIG. 16 shows an embodiment of the invention, the shaft 6 operates in the shaft opening 17 without a seal between the shaft and the shaft opening 17, instead a bellow 161 surrounding the shaft or other component making the top chamber TC confined from the surroundings of the actuator.

An advantage of this embodiment is that there is no top seal needed.

In an embodiment at least two actuator systems are connected in parallel or in series, either by a joint fixing structure, not shown, or by connecting actuator systems together.

In an embodiment, with at least two actuator systems, the at least two top chambers TC of the connected actuator systems are connected, and/or the at least two bottom chambers BC of the connected actuator systems are connected.

An advantage of this embodiment is that inertia per stall force is minimized, and the chamber volume is doubled or more. By connecting the chambers of the connected MLS, it is possible to increase the effect of the utilization of the chambers.

This technology should not be seen as field specific, but can be used in many different areas.

In summary the invention relates to an actuator system with a magnetic lead screw (50), comprises a magnetic rotor (5) and a translator cylinder (2), the translator cylinder (2) comprises a magnetic stator (16), the translator cylinder (2) has a closed first end (14) and a second end confined by a lid (8), the lid having a shaft opening (17) for a shaft (6) coupled to the magnetic rotor (5), wherein the magnetic rotor (5), when inserted in the translator cylinder (2), is arranged to translate a linear movement of the translator cylinder (2) into a rotational movement of the magnetic rotor by using magnetic flux (82) interacting between the magnetic stator and the magnetic rotor, said rotational movements is being transferred through a shaft (6), the lid (8) with a shaft opening (17) arranged for receiving the shaft (6), wherein the shaft is arranged to make both the linear and the rotational movement in the shaft opening (17), the lid (8) being arranged for confining the second end (15) of the translator cylinder (2), the translator cylinder confined by the lid (8) forms, when divided by the magnetic rotor (5), a first chamber (TC) with a first volume and a second chamber (BC) with a second volume, wherein the first volume and the second volume changes as a function of the linear movement. The invention also relates to a method of operating a magnetic lead screw.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. An actuator system comprising:
   a magnetic lead screw, comprises a magnetic rotor and a translator cylinder, the translator cylinder comprises a magnetic stator, the translator cylinder has a closed first end and a second end confined by a lid, the lid having a shaft opening for a shaft coupled to the magnetic rotor, wherein the magnetic rotor, when inserted in the translator cylinder, is arranged to translate a linear movement of the translator cylinder into a rotational movement by using magnetic flux interacting between the magnetic stator and the magnetic rotor, said rotational movements is being transferred through the shaft, the lid with the shaft opening arranged for receiving the shaft, wherein the shaft is arranged to make both the linear and the rotational movement in the shaft opening, the lid being arranged for confining the second end of the translator cylinder, the translator cylinder confined by the lid forms, when divided by the magnetic rotor, a first chamber with a first volume and a second chamber with a second volume, wherein the first volume and the second volume changes as a function of the linear movement and wherein the first chamber and the second chamber are sealed from each other by at least one first seal arranged to operate between the translator cylinder and the magnetic rotor.

2. The actuator system according to claim 1, wherein the magnetic rotor is arranged with a magnetic domain forming a helical shape and the magnetic stator is arranged with a magnetic domain forming a helically shape.

3. The actuator system according to claim 1, wherein a top chamber is arranged to be sealed by at least one second seal.

4. The actuator system according to claim 1, wherein the magnetic rotor is arranged in the translator cylinder with at least one guide system.

5. The actuator system according to claim 1, wherein the first chamber comprises a first fluid and the second chamber comprises a second fluid.

6. The actuator system according to claim 5, wherein the system further comprises at least one reservoir tank, said reservoir tank being arranged for communicating with the first fluid and the second fluid.

7. The actuator system according to claim 5, wherein the system further comprises at least one reservoir tank, said reservoir tank being arranged for communicating with the first fluid.

8. The actuator system according to claim 5, wherein the system further comprises at least one reservoir tank, said reservoir tank being arranged for communicating with the second fluid.

9. The actuator system according to claim 1, wherein the first chamber comprises at least one valve arranged for controlling a pressure in said chamber.

10. The actuator system according to claim 1, wherein the second chamber comprises at least one valve arranged for controlling a pressure in said chamber.

11. The actuator system according to claim 1, wherein the system further comprises an electrical machine, and wherein the shaft is connected with the electrical machine.

12. The actuator system according to claim 11, wherein the shaft transfers the rotational movement of the rotor to the electrical machine through a shaft coupling coupled to the shaft.

13. The actuator system according to claim 1, wherein the first chamber and the second chamber each comprises at least one valve arranged for controlling a pressure in the chamber.

14. The actuator system according to claim 1, wherein at least one of the first chamber and the second chamber operates as a pump.

15. The actuator system according to claim 1, wherein at least one of the first chamber and the second chamber works as a spring or a damper.

16. The actuator system according to claim 1, wherein the magnetic lead screw is configured as an active damper for a vehicle.

17. The actuator system according to claim 16, wherein the active damper further comprises a coil spring.

18. Method for operating an actuator system, the actuator system comprises a magnetic lead screw, with a magnetic rotor being operably positioned in a translator cylinder with a magnetic stator, the translator cylinder having, a closed first end and a second end confined by a lid, the lid having a shaft opening for a shaft coupled to the magnetic rotor, the method comprising:

providing a linear movement of the translator cylinder, translating the linear movement of the translator cylinder into a rotational movement of the magnetic rotor by using a magnetic flux interacting between the magnetic stator and the magnetic rotor, said rotational movement being transferred through the shaft, receiving the shaft in the shaft opening, where the shaft carries out both the linear and the rotational movement in the shaft opening, dividing the translator cylinder by the magnetic rotor, and thereby forming a first chamber with a first volume and a second chamber with a second volume, changing the first volume and the second volume as a function of the linear movement.

* * * * *